US012569405B2

(12) United States Patent
Gregory

(10) Patent No.: US 12,569,405 B2
(45) Date of Patent: Mar. 10, 2026

(54) PILL GRINDER

(71) Applicant: WIZARD TABEZE LIMITED

(72) Inventor: Paul Gregory, Waltham Cross (GB)

( * ) Notice: Subject to any disclaimer, the term of this patent is extended or adjusted under 35 U.S.C. 154(b) by 288 days.

(21) Appl. No.: 18/290,430

(22) PCT Filed: May 19, 2022

(86) PCT No.: PCT/IB2022/054663
§ 371 (c)(1),
(2) Date: Nov. 13, 2023

(87) PCT Pub. No.: WO2022/243918
PCT Pub. Date: Nov. 24, 2022

(65) Prior Publication Data

US 2024/0252401 A1 Aug. 1, 2024

(30) Foreign Application Priority Data

May 20, 2021 (GB) ..................................... 2107271

(51) Int. Cl.
*A61J 7/00* (2006.01)
*A61J 3/02* (2006.01)

(52) U.S. Cl.
CPC ............... *A61J 7/0007* (2013.01); *A61J 3/02* (2013.01); *A61J 2200/70* (2013.01)

(58) Field of Classification Search
CPC .. A47J 42/06; A47J 42/40; A47J 42/42; A47J 42/44; A47J 42/46; A47J 42/56; A61J 7/0007; A61J 3/02; A61J 2200/70
See application file for complete search history.

(56) References Cited

U.S. PATENT DOCUMENTS 12,108,913 B2 * 10/2024 Kuempel ................ A47J 42/46
2018/0213838 A1 * 8/2018 Richmond ............... A24B 7/04
2021/0113021 A1 * 4/2021 Liu ......................... A47J 42/46

FOREIGN PATENT DOCUMENTS

| | | |
|---|---|---|
| CN | 109999967 | 7/2019 |
| CN | 110813477 | 2/2020 |
| CN | 240545484 | 5/2020 |
| CN | 211070392 | 7/2020 |
| CN | 211865328 | 11/2020 |
| CN | 112245294 A | 1/2021 |
| CN | 112473951 | 3/2021 |
| GB | 2568294 | 5/2019 |
| WO | 2019/061680 | 4/2019 |

OTHER PUBLICATIONS

"Notification of Transmittal of the International Search Report and the Written Opinion of the International Searching Authority, or the Declaration" in PCT/IB2022/054663 mailed Aug. 30, 2022.

* cited by examiner

*Primary Examiner* — Mohammed S. Alawadi
(74) *Attorney, Agent, or Firm* — William H. Bollman

(57) ABSTRACT

The present invention provides a pill grinder including a housing containing a grinding mechanism which is driven by a drive means.
The grinding mechanism comprises first and second relatively rotatable grinding plates, between which a pill is ground. The pill grinder further includes a powder reservoir for receiving ground pill powder; and at least one juddering device which is operative to apply a vibrating force in order to dislodge ground pill powder from surfaces or recesses within the housing.

20 Claims, 4 Drawing Sheets

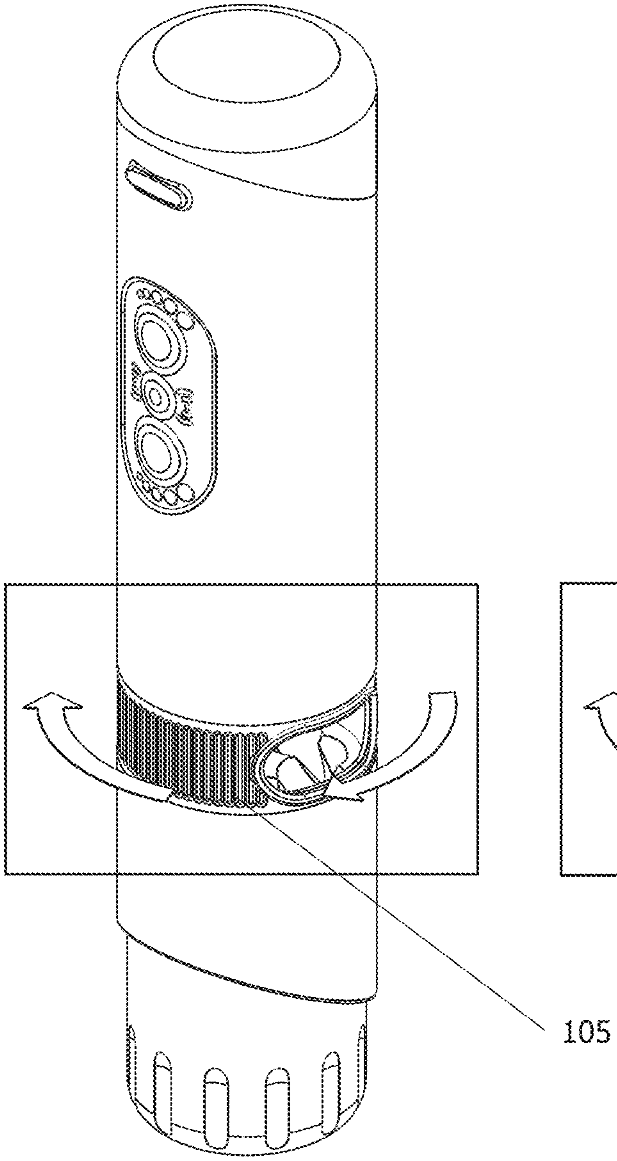
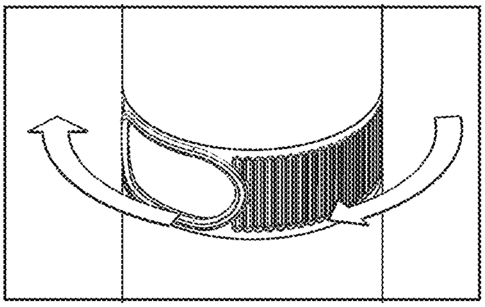
FIG. 2B
FIG. 2A

PILL GRINDER

This application claims priority from PCT/IB2022/054663 entitled "A Pill Grinder", filed May 19, 2022, which in turn claims priority to GB 2107271.5 filed May 20, 2021, the entirety of both of which are expressly incorporated herein by reference.

FIELD OF THE INVENTION

The present invention relates to a pill grinder for providing ground pill powder, from for example medicaments and/or vitamins.

BACKGROUND

Many people are prescribed medication or vitamins to be taken daily to treat ailments or conditions. Medication and vitamins can be provided in tablets or pills of a range of different sizes. In order to be effective, a user is required to swallow the tablets or pills, as prescribed, and the tablet or pill is then absorbed into the human body.

Some users can however find it difficult to swallow tablets and pills for a variety of reasons, including for example the size of the tablets and pills and conditions giving rise to swallowing issues. Some users may not like the taste of the tablets and pills and this can also give rise to the user being reluctant to swallow the medication or vitamins.

As children get older, the medication typically changes from a liquid form to tablets or pills. Children may not be comfortable taking these and this can lead to swallowing issues. These factors can cause unnecessary stress for the user. Furthermore, it has been found that some capsules do not absorb easily and can pass through the body without being absorbed.

There is therefore a need for a device which improves the ease in which medication or vitamins, in the form of tablets or pills, can be self-administered.

Another problem that is experienced by pill grinders has been that after pills are ground an amount of powder tends to adhere to inner surfaces of the grinding. This results in less than the entire pill being provided which is not optimum when a particular amount of medicament is required.

PRIOR ART

UK patent GB 2 568 294 (Gregory) discloses a pill blender which is operable in one of two different orientations. When oriented in a second orientation the medicine blender transfers pills or tablets from a storage compartment to an opening to the grinder.

Chinese patent application number CN 109999967 (Wang Linlin) discloses a vacuum medicine grinding device which dries medicine through vacuum extraction and then grinds and refines the medicine in two stages by relative rotation of a stacking blade, a grinding head and a grinding cylinder.

Chinese patent application number CN 110813477 (Lishui Number 2 People Hospital) discloses a tablet grinding device for medical care. The device overcomes non-uniform grinding of tablets by providing an inner container and a grinding disc. A fixed groove is formed in the fixed base, the grinding disc is arranged in the grinding inner container. An elastic fixed part is connected between the grinding inner container and the inner bottom wall of the fixed groove and a scraping assembly is fixed to the outer wall of the top of the grinding inner container.

Chinese patent application number CN 112473951 (Wang Qiren) discloses an anti-adhesion medicine tablet crushing device. The tablet crushing device comprises a shell, wherein a cover body is fixedly connected to the bottom end of the shell. A feeding port is formed in a side wall of the top of the shell. The anti-adhesion medical tablet crushing device, the outer side of the inner wall of an inner cavity of the shell can be knocked while tablets are crushed, so that tablet powder on the inner wall of the inner cavity of the shell is better separated and adhesion of medicine powder is avoided.

Chinese utility model number CN 240545484 (Gansu et al) discloses a medicine pulveriser. A motor is arranged on the machine shell. A screening assembly is arranged in a powder outlet. The screening assembly comprises an elastic hose, a vibrating screen and a vibration exciter. The elastic hose is respectively connected with the powder outlet and the vibrating screen, and the vibrating screen vibrates by the aid of the vibration exciter.

Chinese utility model number CN 211070392 (Huang Liting) discloses a solid tablet grinding device. The device comprises a box body, a base, a grinding disc, a crushing device, a screen and a vibrator. A connecting block is installed at the bottom of the box body.

Chinese utility model number CN 211865328 (Affiliated Hospital of Zunyi Medical College) discloses a drug crushing device with a screening function. The device comprises a support table and a motor. An upper end of the support table is connected to a supporting column. A storage tank is mounted at an upper middle end of the support table.

International patent application number WO 2019/061680 (Yang Song) discloses a pulsating drug pressing device and a method for using same. The pulsating drug pressing device comprises: a pressing and grinding cover and a pressing and grinding support cylinder, wherein the pressing and grinding cover at least comprises a cylindrical boss and an annular side wall surrounding the cylindrical boss and having a first loose fit wide pitch thread the end face. Although successful, the aforementioned pill blender suffered from occasional clogging of grinding plates and therefore required disassembly and cleaning.

SUMMARY OF THE INVENTION

According to a first aspect of the present invention there is provided a pill grinder including: a housing containing a grinding mechanism which is driven by an electric motor drive means and a planetary gearbox, the grinding mechanism comprises first and second relatively rotatable grinding plates, between which a pill is ground; a powder reservoir for receiving ground pill powder; a sensor which senses a clog of ground pill powder; at least one juddering device which is operative to apply a vibrating force in order to dislodge ground pill powder from surfaces or recesses within the housing upon receipt of a signal from the sensor when a clog of ground pill powder is sensed; and a reverse switch which alters the direction of movement of the motor in order to enable the motor to run forwards or backwards.

In this way the pill grinder provides an effective way of grinding pills and ensuring that all ground powder is freed from the mechanism into the powder reservoir. Advantageously this ensures that the full dosage is received, and that no partially crushed remnants remain in the mechanism.

The pill grinder is portable so that pills are ground when required.

The pill grinder may comprise a loading chamber configured to receive and store one or more tablet(s) and/or pill(s) therein. The loading chamber is preferably in communication with the grinding mechanism and operable to supply tablet(s) and/or pill(s) to the grinding mechanism when required.

Preferably the drive means includes an electric motor so that the motor drives the rotatable grinding plates. In this way a user can automatically grind the tablets.

Typically the drive means is activated by a switch, for example a button that may be pressed by a user.

Preferably the juddering device has a user operated actuation means, such as a button.

In some embodiments, the same actuation means, for example the same button, may be used to activate the motor to drive the grinding plates and the juddering device.

The juddering device receives a signal from a sensor which senses a clog of ground pill powder and causes the juddering device to apply the vibrating force.

For example, a clog of ground pill powder may be detected on a grinding plate and once the presence is sensed by the sensor the juddering device is activated to dislodge the clog.

Preferably a speed varying means is provided to vary the speed of the motor. In this way the speed of grinding the tablets can be varied. For example, the motor speeds may be selected depending upon the type or number of pills to be grinded. Preferably motor speeds are selected to reduce atomisation of the powder during the grinding process.

Ideally at least a portion of an inner surface of the housing has an anti-static coating to limit adhesion of the pill powder to the housing. In this way the full amount of the pill is more likely to reach the powder reservoir. The anti-static coating reduces the level of pill dust retained within the grinder.

In some embodiments at least a portion of the housing is transparent to allow observation of at least part of a grinding process to enable a user to visually monitor grinding of the pills. In this way a user may press and hold the button to activate the grinding plates for the desired duration, by observing when the pills have passed through the grinding plates.

Preferably the housing includes batteries to power the motor and juddering device. Ideally at least one of the batteries are rechargeable.

In some embodiments the pill grinder includes a charging port, such as a USB connection port to enable the at least one rechargeable battery to be charged whilst remaining within the housing.

The charging port may include a protective cover to close the charging port when not in use.

The pill grinder has removable components to enable replacement of worn out components thus extending its usable life.

In some embodiments the grinding plates are removable from the housing, for example for replacement, repair or cleaning.

In some embodiments the powder reservoir is removable for example for replacement, repair or cleaning and/or to remove ground powder.

The pill grinder may further comprise a magnet located on a driveshaft, in which the magnet is configured to retain the grinding mechanism within a gearbox. In this way, the grinding mechanism may be retained in positioned within the gearbox whilst the grinder is disassembled, for example for replacement, repair or cleaning.

The pill grinder may comprise a pill access cover configured to be rotatable to open a recess in the housing to allow access to the loading window. In some embodiments the pill access cover is rotatable about 360 degrees in both clockwise and anti-clockwise directions.

The pill grinder comprises a reverse switch operable to enable the motor to run forwards or backwards. The reverse switch is used to alter the direction of movement of the motor in order to provide an efficient grinding mechanism whilst reducing clogging.

The pill grinder may also include a switch operable to enable the motor to pulse. The switch may be used to reduce clogging of the grinding mechanism.

In one embodiment, the pill grinder may further comprise a light emitting diode (LED) configured to indicate an operational state of the pill grinder. For example, the light emitting diode may be operable to be illuminated green to provide a visual indication that the grinder is 'on', blue to provide a visual indication that the motor is running forwards, and red to provide a visual indication that the motor is running backwards.

In one embodiment, the pill grinder comprises a light emitting diode (LED) operable to indicate the charge status of the at least one battery. The pill grinder may therefore be operable to provide a visual indication to a user that the grinder needs to be charged prior to the battery running out of charge. Optionally the LED is configured to flash to confirm an end of programme or cycle.

In another embodiment a 'buzzer' may sound to confirm an end of programme or cycle.

The processor monitors and/or controls the at least one light emitting diode (LED) in order to indicate The processor monitors and/or controls at least one buzzer.

The removeable components of the pill grinder are preferably dishwasher safe, enabling the user to clean the removable components easily and efficiently without risk of damage to the components.

The pill grinder preferably comprises a shock absorbing casing for protection against unintentional knocks or bangs, for example if dropped.

The pill grinder preferably comprises a foot to enable the pill grinder to be placed on a surface during charging.

It is to be understood that the pill grinder may be provided in any suitable size depending on the particular requirements. For example, the pill grinder may be provided in a small size for use with a small volume of pills, or a large size for use with a larger volume of pills.

Optionally a docking or charging station is supplied with the pill grinder. The charging port may be provided in the docking or charging station so that when adapted for connection to a mains supply, the pill grinder may be received and supported in a cradle with contacts therein to enable the recharging of the battery to be performed when the pill grinder is not use.

In another embodiment a separate button may be included to assist visually impaired users. The separate button may be raised to help a user to distinguish a programme 'cycle' or to indicate forward, reverse and pulse modes of operation.

Preferred embodiments of the invention will now be described, by way of example only, and with reference to the Figures in which:

BRIEF DESCRIPTION OF FIGURES

FIG. 2A is a schematic illustration of a perspective view of the pill grinder of FIGS. 1A and 1B;

FIG. 2B is a schematic illustration of an enlarged view of the rotatable pill hatch access cover of FIGS. 1A and 1B.

DETAILED DESCRIPTION OF FIGURES

With reference to the Figures, the pill grinder 100 includes: a housing in the form of a main body housing 104 located towards the proximal end thereof, and a grinding mechanism housing 106 located towards the distal end of the housing.

Figure 1B:
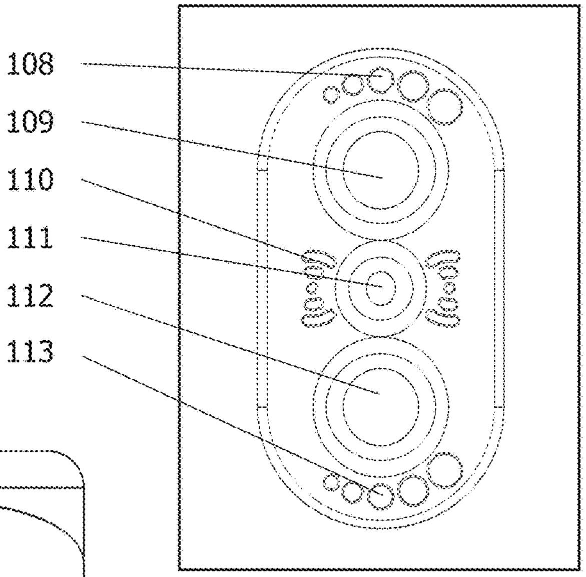
FIG. 1B is a schematic illustration of an enlarged view of the control panel of the pill grinder of FIG. 1A.
Figure 1A:
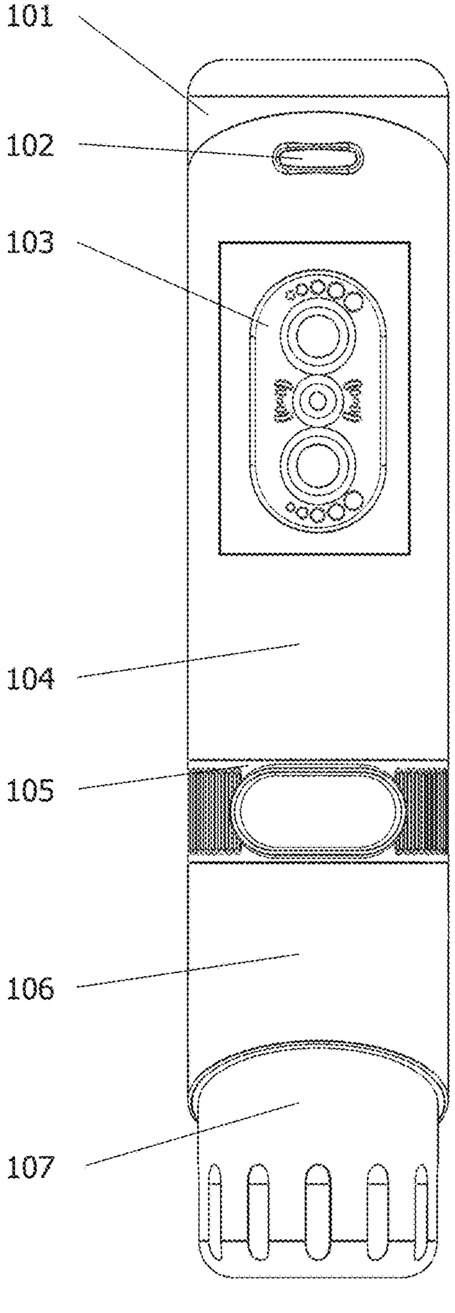
FIG. 1A is a schematic illustration of a front view of one embodiment of the pill grinder of the present invention.
Figure 3A:
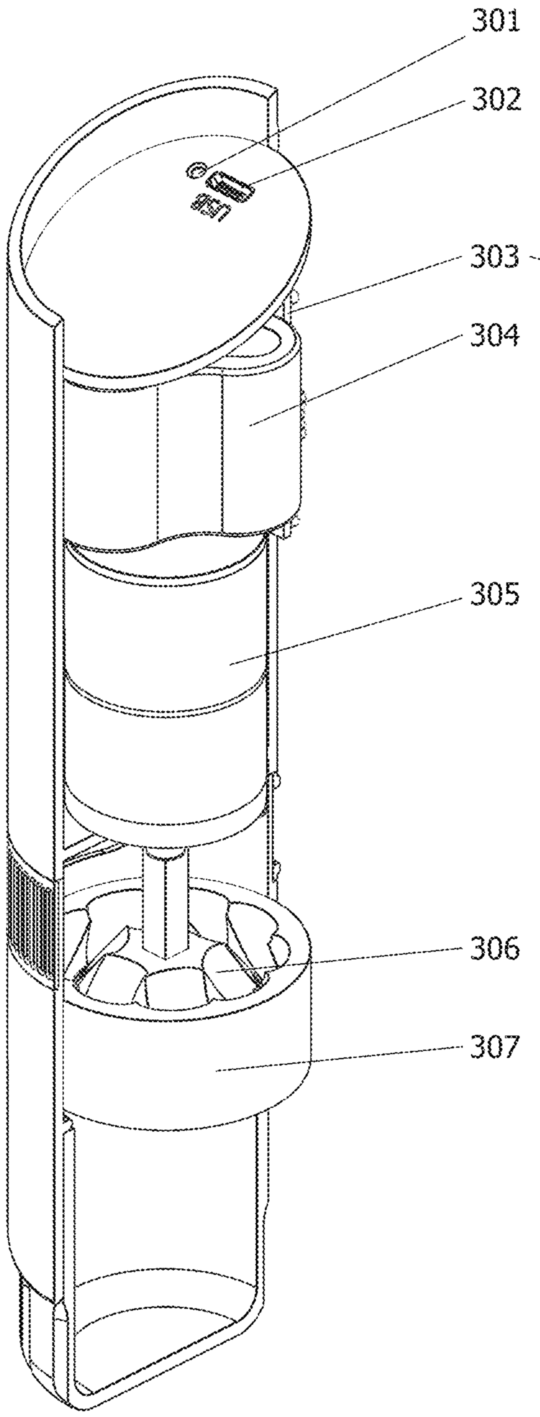
FIGS. 3A and 3B are schematic illustrations of the pill grinder of FIGS. 1A and 1B when dismantled.
Figure 3B:
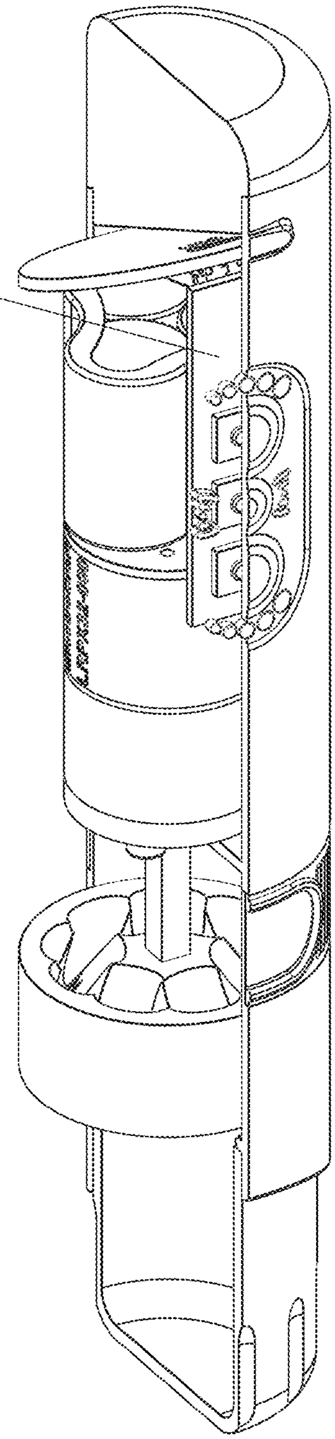

The main body housing 104 comprises a control panel 103 comprising a number of LED indicators 108, 110, 113 and control buttons 109, 111, 112 as shown in FIG. 1*b*.

The control panel 103 comprises five "forward" LED indicators 108 which are operable to provide an indication to the user that the grinding mechanism of the pill grinder 100 is operating in a forwards direction. Furthermore, the control panel 103 comprises five "backward" LED indicators 113 which are operable to provide an indication to the user that the grinding mechanism of the pill grinder 100 is operating in a backwards direction. The control panel 103 also includes ten "pulse" LED indicators 110, provided as two sets of five LED indicators, operable to provide an indication to the user that the grinding mechanism of the pill grinder 100 is operating in a pulsating manner.

The "forward" LED indicators 108, the "pulse" LED indicators 110 and the "backward" LED indicators 113 may be of any colour or any colour combination. Each set of indicators may include different colour LEDs depending on the requirements.

Ideally the control of the grinder is by way of a processor which is mounted on a printed circuit board (PCB) together with other electronic components, such as amplifiers and sensing devices.

The processor is operative to monitor and/or control at least one of the following: motor speed, motor direction, pulsing of the motor, the at least one juddering device and the signal from the sensor which senses clogging of ground pill powder.

Each LED within each set of LED indicators may be operable, under supervision of the processor, to be illuminated separately, sequentially or at the same time as the other LEDs within the set of LED indicators depending on the requirements for the LED indicators. It is to be understood that although in the illustrated embodiment, the pill grinder 100 has a number of sets of LED indicators, each set comprising five LEDs, the pill grinder 100 may include a single LED indicator rather than a set of LED indicators. Alternatively, each set of LED indicators may include any suitable number of LEDs and is not to be limited to five LEDs.

The main body housing 104 further comprises a USB charging port 302, a USB charging LED indicator 301, and charging port cover 101 at a proximal end thereof. The charging port cover 101 is composed of shock absorbent material, such as for example, to minimise any potential damage from unintentional knocks, bangs or from being dropped.

The main body housing 104 further comprises a stability foot 102 for use while charging the pill grinder 100 and configured to prevent rolling of the grinder 100.

The main body housing 104 further comprises a PCB 303 in communication with a "forward" grind button 109, a "pulse forward and back" grind button 111, and a "back" grind button 112.

The PCB 303 is in communication with a rechargeable battery 304.

The pill grinder 100 further comprises a rotatable pill hatch access cover 105 located between the main body housing 104 and the grinding mechanism housing 106. Optionally the cap 107, when fitted to the housing defines a leak proof container to which water or other liquid may be added and allowed to mix with the ground powder in the cap. This enables the contents to be consumed directly from the cap. This further reduces powder loss and enhances the grinders ease of use. A suitable O-ring seal (not shown) may be provided between the cap and the housing to improve the liquid tight properties of the cap.

The grinding mechanism housing 106 provides an inlet, at a proximal end thereof, for receiving medication or vitamins in the form of tablets or pills therethrough to be received into a grinding chamber. The chamber comprises a motor and planetary gearbox 305, a grinding mechanism moving rotor 306 and a grinding mechanism fixed face 307.

The rotatable pill hatch access cover 105 comprises an opening which is rotatable, preferably a full 360 degree rotatable, relative to and about the longitudinal axes the grinding mechanism housing 106. During rotation, the opening of the rotatable pill hatch access cover 105 is configured to be aligned with the inlet of the grinding mechanism housing 106 to allow passage of a tablet or pill therethrough into the chamber.

The pill grinder 100 further comprises a ground powder collection cap 107 located and in communication with the distal end of the grinding mechanism housing 106 to receive ground powder therefrom. It is appreciated that the collection cap may also be used to store tablets or pills prior to being ground.

Each of the rotatable pill hatch access cover 105, the grinding mechanism housing 106, the collection cap 107, the grinding mechanism moving rotor and fixed face 306, 307 are coated with anti-static coating to prevent the build of powder in the form of clogs.

In use, the user rotate the rotatable pill hatch access cover 105 until the opening is aligned with the inlet of the grinding mechanism housing 106. The user inserts the tablet(s) or pill(s) through the opening and inlet into the chamber of the grinding mechanism housing 106. The user then continues to rotate the cover 105 to prevent further access to the inlet and chamber of the housing 106.

The user activates the grinding of the tablet(s)/pill(s) by pressing one of the buttons 109, 111, 112. The grinding mechanism moving rotor 306 rotates relative to the fixed face 307 and grinds the tablet(s)/pill(s) to ground powder.

The ground powder exits the chamber of the grinding mechanism housing 106 and is collected in the collection cap 107. In the illustrated embodiment, the cap 107 is transparent enabling the user to monitor the grinding process. It is however to be understood that the cap 107 may be composed of any suitable material and does not have to be transparent.

Once the tablet(s)/pill(s) have been ground to powder, the user can stop the grinding mechanism by pressing a control button 109, 111, 112. To prevent clogging, the user can change the direction and/or pulsation of the grinding by selecting an appropriate button 109, 111, 112.

It is to be understood that in one embodiment, the rotatable pill hatch access cover 105 is in communication with an inlet of a storage chamber. The storage chamber is configured to receive and store tablets/pills prior to grinding. The storage chamber is in communication with the grinding mechanism and is configured to supply tablets/pills to the grinding mechanism as required. This enables pills and tablets to be carried and ground when required.

The invention was tested using commercially available methods, devices and materials.

Commercially available tablets (dose per tablet: 500 mg) were sourced. Each tablet was weighed before being placed into the pill grinder. Upon tablet placement, the sliding door to the grinding area was closed. The pill grinder was then held vertically and operated in a forward direction until the motor stalled, upon which the motor was operated in reverse until the motor stalled. This alternating of direction was continued until the motor could run freely in the forward direction.

Once this stage had been reached, the pill grinder was permitted to run for a further ten seconds to allow the tablet to be fully ground. After this time had elapsed, the bottom of the pill grinder was removed and placed onto a previously tared balance in order to weigh the ground tablet.

Figure 4:
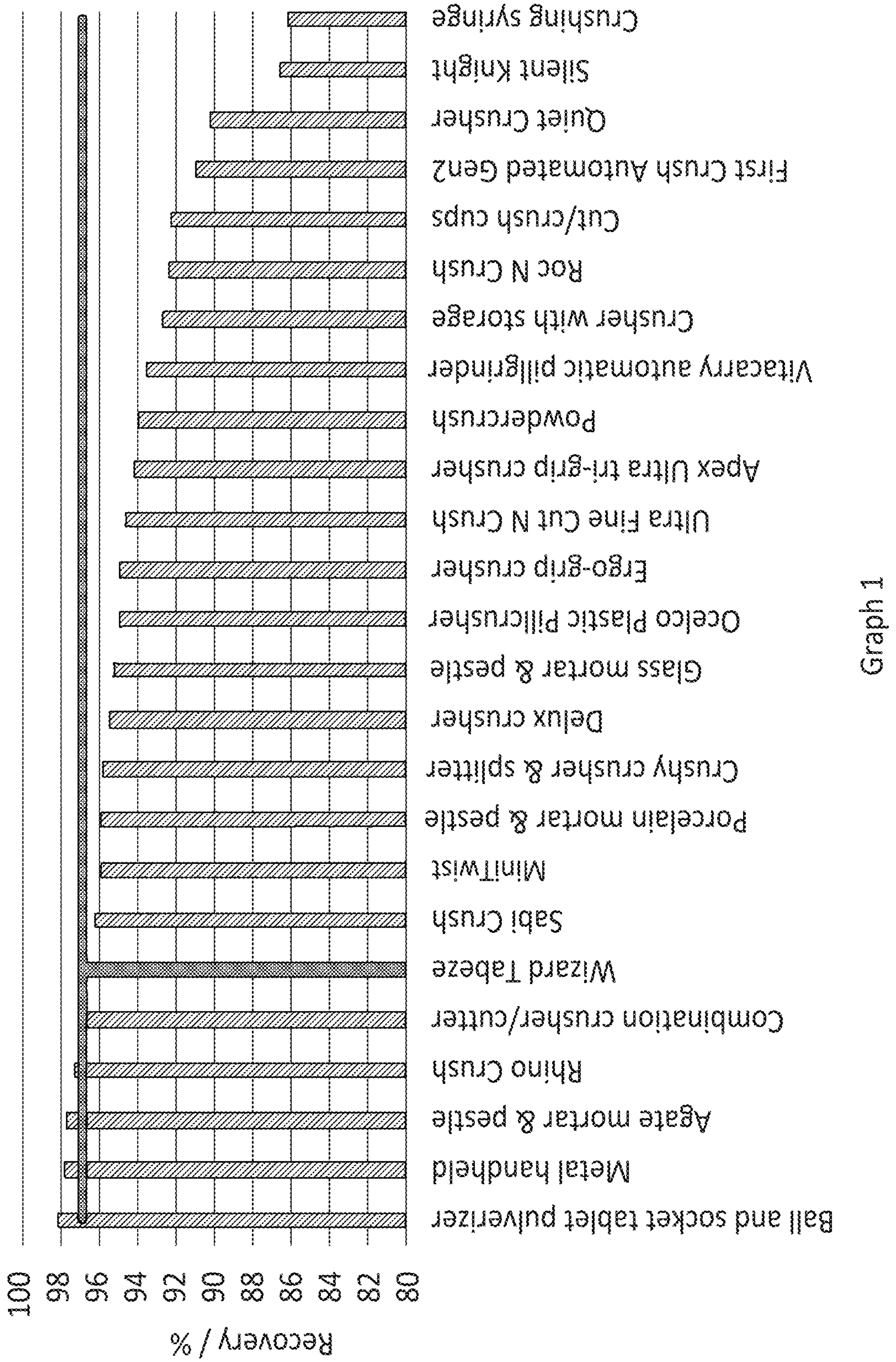

Any discrepancy between the mass of the original tablet and the recovered ground tablet was deemed to be ‘loss’. The results of trials are shown in Table 1 of FIG. 4 below.

TABLE 1

Table 1: Recovery and loss rates for ground paracetamol tablets.

| Run | Tablet/ g | Recovered/ g | Recovered/ % | Loss/ g | Loss/ % |
|---|---|---|---|---|---|
| 1 | 0.578 | 0.559 | 96.7 | 0.019 | 3.3 |
| 2 | 0.578 | 0.566 | 97.9 | 0.012 | 2.1 |
| 3 | 0.576 | 0.563 | 97.7 | 0.013 | 2.3 |
| 4 | 0.579 | 0.554 | 95.7 | 0.025 | 4.3 |
| 5 | 0.579 | 0.558 | 96.4 | 0.021 | 3.6 |
| 6 | 0.580 | 0.570 | 98.3 | 0.010 | 1.7 |
| 7 | 0.577 | 0.567 | 98.3 | 0.010 | 1.7 |
| 8 | 0.578 | 0.553 | 95.7 | 0.025 | 4.3 |
| 9 | 0.576 | 0.551 | 95.7 | 0.025 | 4.3 |
| 10 | 0.577 | 0.556 | 96.4 | 0.021 | 3.6 |
| Average | 0.578 | 0.560 | 96.9 | 0.018 | 3.1 |

The typical weight of a commercial paracetamol tablet was found to be 0.578 g, with a tight range of just 0.004 g.

Recovery of the ground tablet is high, at an average of 96.9% with a standard deviation of 1.0%. The corresponding loss of drug stands at an average of 0.018 g, or 3.1% of the original tablet.

Comparison to existing devices was achieved using the publication by Thong et al. The results of which can be seen in Table 1.

The reported competitors have a range of ground powder recovery rates, from 86.3% to 98.1%. The embodiment of the invention which was tested can therefore seen to be competitive in this field, having a recovery rate of 96.9%.

It should be noted that all of the tablet grinding devices which outperform the tested device are either direct pestle and mortar systems, or non-rotating pivot-like crushing systems and therefore do not possess the advantageous features of the present invention, such as hygiene, consistency and reliability.

Additionally, all of these devices are hand operated. Thereby, the device tested is both the highest performing powered device, and the highest performing grinding (as opposed to crushing) device.

The present invention therefore enables quick and easy grinding of tablets or pills into ground powder to enable a user to administer the medicine more easily with improved absorption.

In another embodiment a wireless communication device is connected to control circuitry and/or a processor that is housed in the pill grinder. The wireless communication device, which is ideally operating under a Bluetooth® wireless protocol, is operable to receive a command signal from a mobile communication device, such as a mobile telephone. The command signal typically includes tablet grinding instructions for controlling motor speed and grinding intensity and duration of grinding. These factors may be important for grinding a particular food supplement or medicament in accordance with manufacturer’s guidelines or a specific health or diet or treatment plan. By supplying a specific set of instructions the user is thereby assured of a correct grinding time and conditions resulting in the correctly ground product.

Furthermore the present invention reduces the risk of clogging or loss of tablets/pills on surfaces of the pill grinder, by the inclusion of pulsating mechanism and/or anti-static coating therefore increasing the efficiency of the grinder.

The invention has been described by way of examples only and it will be appreciated that variation may be made to the above-mentioned embodiments without departing from the scope of protection as defined by the claims.

The invention claimed is:

1. A pill grinder, comprising:

a housing containing a grinding mechanism driven by an electric motor and a planetary gearbox, the grinding mechanism comprises first and second relatively rotatable grinding plates, between which a pill is ground into ground pill powder;

a powder reservoir for receiving the ground pill powder;

a sensor to sense a clog of the ground pill powder;

at least one juddering device operative to apply a vibrating force in order to dislodge ground pill powder from surfaces or recesses within the housing upon receipt of a signal from the sensor when the clog of the ground pill powder is sensed; and a reverse switch to alter a direction of movement of the electric motor in order to enable the electric motor to run forwards or backwards.

2. The pill grinder according to claim 1, wherein:

the at least one juddering device has a user operated actuation button.

3. The pill grinder according to claim 1, wherein;

a user input provides selection of a speed of the electric motor.

4. The pill grinder according to claim 1, wherein:

at least a portion of an inner surface of the housing has an anti-static coating.

5. The pill grinder according to claim 1, wherein:

at least a portion of the housing is transparent to allow observation of at least part of a grinding process.

6. The pill grinder according to claim 1, wherein:

the housing is adapted to receive at least one battery to power the electric motor.

7. The pill grinder according to claim 1, wherein;

the first and second grinding plates and the powder reservoir are removable from the housing, for removal of ground powder from the reservoir, replacement, repair or cleaning.

8. The pill grinder according to claim 7, wherein:

a magnet is located on a driveshaft to retain the grinding mechanism in the planetary gearbox whilst the grinder is in a disassembled state.

9. The pill grinder according to claim 1, wherein:

a pill access cover rotatable to open a recess in the housing to allow access to a loading window.

10. The pill grinder according to claim 9, wherein:

the pill access cover is rotatable by 360 degrees in both clockwise and anti-clockwise directions of the movement of the electric motor.

11. The pill grinder according to claim 1, wherein:

a switch to switch the electric motor to a pulse mode.

12. The pill grinder according to claim 1, further comprising:

at least one light emitting diode (LED) to indicate an operational state of the pill grinder.

13. The pill grinder according to claim 1, wherein:

at least one light emitting diode (LED) to indicate a charge status of the at least one battery to power the electric motor.

14. The pill grinder according to claim 1, wherein:

the powder reservoir is user removable and dishwasher safe.

15. The pill grinder according to claim 1, wherein the housing comprises:

a shock absorbing casing.

16. The pill grinder according to claim 1, wherein:

the housing includes a printed circuit board (PCB) on which electronic components are mounted.

17. The pill grinder according to claim 16, wherein:

the printed circuit board (PCB) has a processor mounted thereon, the processor being configured to monitor and/or control at least one of the following:

motor speed of the electric motor, motor direction of the electric motor, pulsing of the electric motor, the at least one juddering device, and the signal from the sensor which senses the clog of the ground pill powder.

18. The pill grinder according to claim 17, wherein:

the processor is further configured to control at least one light emitting diode (LED) to indicate an operational state of the pill grinder.

19. The pill grinder according to claim 17, wherein:

the processor is further configured to monitor and/or control at least one buzzer to sound to confirm an end of a cycle.

20. The pill grinder according to claim 1, further comprising:

a wireless communication device operable to receive a command signal from a mobile communication device, the command signal including tablet grinding instructions for controlling a motor speed of the electric motor, grinding intensity, and duration of grinding.

* * * * *